(12) United States Patent
Doering et al.

(10) Patent No.: US 10,655,989 B2
(45) Date of Patent: May 19, 2020

(54) PRESSURE SENSOR CAP HAVING FLOW PATH WITH DIMENSION VARIATION

(71) Applicant: Silicon Microstructures, Inc., Milpitas, CA (US)

(72) Inventors: Holger Doering, San Jose, CA (US); Omar Abed, San Jose, CA (US)

(73) Assignee: SILICON MICROSTRUCTURES, INC., Milpitas, CA (US)

( * ) Notice: Subject to any disclaimer, the term of this patent is extended or adjusted under 35 U.S.C. 154(b) by 0 days.

(21) Appl. No.: 16/129,355

(22) Filed: Sep. 12, 2018

(65) Prior Publication Data

US 2019/0078914 A1 Mar. 14, 2019

Related U.S. Application Data

(60) Provisional application No. 62/557,536, filed on Sep. 12, 2017.

(51) Int. Cl.
| | | |
|---|---|---|
| *G01F 1/40* | (2006.01) | |
| *G01F 1/36* | (2006.01) | |
| *G01L 1/10* | (2006.01) | |
| *G01F 1/44* | (2006.01) | |

(52) U.S. Cl.
CPC ............... *G01F 1/40* (2013.01); *G01F 1/363* (2013.01); *G01F 1/44* (2013.01); *G01L 1/106* (2013.01)

(58) Field of Classification Search
CPC ............... G01F 1/40; G01F 1/36; G01L 1/106
See application file for complete search history.

(56) References Cited

U.S. PATENT DOCUMENTS

| | | |
|---|---|---|
| 4,888,988 A | 12/1989 | Lee et al. |
| 5,014,552 A | 5/1991 | Kamiunten et al. |
| 5,050,429 A | 9/1991 | Nishimoto et al. |
| 5,291,781 A | 3/1994 | Nagata et al. |
| 5,412,993 A | 5/1995 | Ohtani |
| 5,656,773 A | 8/1997 | Neda |
| 5,804,720 A | 9/1998 | Morimasa et al. |
| 6,579,740 B2 | 6/2003 | Toyoda |
| 6,615,655 B1 | 9/2003 | Sakai et al. |
| 6,655,207 B1 | 12/2003 | Speldrich et al. |
| 6,672,154 B1 | 1/2004 | Yamagishi et al. |
| 6,725,731 B2 | 4/2004 | Wiklund et al. |
| 6,813,944 B2 | 11/2004 | Mayer et al. |

(Continued)

FOREIGN PATENT DOCUMENTS

| | | |
|---|---|---|
| EP | 1568999 A2 | 8/2005 |
| WO | 2004038344 A1 | 5/2004 |

OTHER PUBLICATIONS

Low Pressure Digital Sensor M6X21 Series, Datasheet, Silicon Microstructures, Inc., 2016, 11 pages.

(Continued)

*Primary Examiner* — Jewel V Dowtin

(57) ABSTRACT

Pressure sensors that may be used in flowrate monitoring or measuring systems, where the pressure sensors may enable simple, low-cost designs that are readily implemented. One example may provide a pressure sensor having a built-in flow path with a dimensional variation. Pressures of a fluid on each side of the dimensional variation may be compared to each other. The measured differential pressure may then be converted to a flowrate through the flow path.

20 Claims, 11 Drawing Sheets

(56) References Cited

U.S. PATENT DOCUMENTS

| | | | |
|---|---|---|---|
| 7,028,559 B2* | 4/2006 | Oort | A01J 5/007 |
| | | | 73/861.18 |
| 7,255,001 B1 | 8/2007 | Davis et al. | |
| 8,061,219 B2 | 11/2011 | Rezgui et al. | |
| 2017/0336240 A1* | 11/2017 | Daneyshar | G01F 23/14 |
| 2018/0319587 A1* | 11/2018 | Aston | G01F 1/36 |

OTHER PUBLICATIONS

Kuo. Jonathan T.W., et al., "Micromachined Thermal Flow Sensors—A Review," Micromachines, 2012, vol. 3, pp. 550-573.

Niedenfur, Patrick, "Understanding the different between absolute, gage and differential pressure," First Sensor Blog [online], [retrieved on Dec. 20, 2019]. Retrieved from the Internet <URL: https://blog.first-sensor.com/en/select-pressure-sensors/>, 7 pages.

Flow and Pressure Measurement in Respiratory Medical Equipment SM9000 and SM6000, YouTube Video, Silicon Microstructures, Inc., May 22, 2017, [online], [retrieved on Dec. 20, 2019]. Retrieved from the Internet <URL: https://www.youtube.com/watch?time_continue=2&v=ixWh0bJysVw&feature=emb_logo>, 1 page.

D6F-W Dust Segregation System, Omron Electronic Components LLC, YouTube Video on Manufacturing.NET, Nov. 4, 2008, [online], [retrieved on Dec. 20, 2019]. Retrieved from the Internet <URL: https://www.youtube.com/watch?v=IcToiyypo9s>, 1 page.

"MEMS flow sensor is dust resistant." EETimes [online], Dec. 17, 2007, [retrieved on Dec. 20, 2019]. Retrieved from the Internet <URL: https://www.eetimes.com/mems-flow-sensor-is-dust-resistant/>, 2 pages.

U.S. Appl. No. 16/734,359, filed Jan. 5, 2020 (Unpublished), titled Flow Sensor, Abed et al., 24 pages.

HTD Series—Digital Differential Pressure Sensors, Data Sheet [online], First Sensor, [retrieved on Jan. 10, 2020], Retrieved from the Internet: <URL: https://www.first-sensor.com/cms/upload/datasheets/DS_Standard-HTD_E_11824.pdf>; 14 pages.

Piezoresistive manifold HTD low pressure sensors from 1 mbar, YouTube Video, First Sensor, Nov. 13, 2017, [online], [retrieved on Jan. 10, 2020]. Retrieved from the Internet <URL: https://www.youtube.com/watch?v=zVuoSgyqBNQ&feature=emb_logo>, 1 page.

HTD Amplified Pressure Sensors, Data Sheet [online], First Sensor, [retrieved on Jan. 10, 2020], Retrieved from the Internet: <URL: https://www.first-sensor.com/en/products/pressure-sensors/amplified-pressure-sensors/htd/>, 4 pages.

WBI Series Mass Flow Sensors for Gases, Data Sheet [online], First Sensor, [retrieved on Jan. 10, 2020], Retrieved from the Internet: <URL: https://www.first-senser.com/en/products/flow-sensors/mass-flow-sensors-for-gases/>, 5 pages.

Krassow, H., et al., "The smart-orifice meter: a mini head meter for volume flow measurement," Flow Measurement and Instrumentation, 1999, vol. 10, pp. 109-115.

* cited by examiner

PRESSURE SENSOR CAP HAVING FLOW PATH WITH DIMENSION VARIATION

CROSS-REFERENCES TO RELATED APPLICATIONS

This application is a nonprovisional of U.S. provisional patent application No. 62/557,536, filed Sep. 12, 2017, which is incorporated by reference.

BACKGROUND

Pressure sensors have become ubiquitous the past few years as they have found their way into many types of products. Utilized in automotive, industrial, consumer, and medical products, the demand for pressure sensors has skyrocketed and shows no signs of abating.

Pressure sensors may include pressure sensor chips as well as other components. Pressure sensor chips may include a diaphragm or membrane. Typically, this membrane is formed by creating electronic circuitry, such as a Wheatstone bridge in a silicon wafer, then etching away the silicon from the opposite surface forming a cavity until a thin layer of silicon is formed beneath the electronic circuitry. The thin layer is a membrane that may be surrounded by a thicker, non-etched silicon water portion forming a frame. When a pressure sensor chip in a pressure sensor experiences a pressure, the membrane may respond by changing shape. This change in shape causes one or more characteristics of electronic components on the membrane to change. These changing characteristics can be measured, and from these measurements, the pressure that the pressure sensor chip is exposed to can be determined.

Pressure sensors may be used to measure a pressure of a fluid, where the fluid may be a gas, such as air, or a liquid, such as water. The sensed pressure may be used directly, for example, in a tire pressure sensor. The sensed pressure may be used to determine values of related parameters, such as flowrate. Unfortunately, these systems may be complicated to design, and may be expensive and bulky in their implementation.

Thus, what is needed are pressure sensors, where the pressure sensors may be used in flowrate monitoring or measuring systems and may provide simple, low-cost designs that are readily implemented.

SUMMARY

Accordingly, embodiments of the present invention may provide pressure sensors that may be used in flowrate monitoring or measuring systems and may provide simple, low-cost designs that are readily implemented. An illustrative embodiment of the present invention may provide a pressure sensor having a built-in flow path with a dimensional variation. Pressures of a fluid on each side of the dimensional variation may be compared to each other. The measured differential pressure may then be converted to a flowrate through the flow path. In these and other embodiments of the present invention, the flow path may be formed as part of a package for the pressure sensor, in a cap for a package for a pressure sensor, or otherwise fixed to or associated with a pressure sensor.

These and other embodiments of the present invention may provide a cap for a pressure sensor. The cap may have a flow path having a dimensional variation. The dimensional variation may be a narrowing of the flow path, a venturi, or other partial obstruction. The dimensional variation may be a narrowed portion of material that forms the flow path, it may be formed using an obstruction, such as a ring around an inside wall of the flow path or other type of obstruction, or it may be formed in other ways. The cap may include nozzles to fit to pliable tubing or other flow path structure. Shunt flow paths may be located on each side of the dimensional variation, or the shunt flow paths may be a portion of the dimensional variation, such as when the dimensional variation is a venturi. The shunt flow paths may form flow paths to a differential pressure sensor chip, to two or more pressure sensor chips arranged in absolute or gauge configurations, to three or more pressure sensor chips arranged in absolute or gauge configurations, or to other numbers and configurations of pressure sensor chips. For example, the shunt flow paths may form flow paths to opposing sides of a pressure sensor chip.

These and other embodiments of the present invention may provide a pressure sensor. The pressure sensor may have a cap, the cap having a flow path having a dimensional variation. The cap may include shunt flow paths, one on each side of the dimensional variation. The shunt flow paths may be arranged to mate with passages in a pressure sensor package. The cap may be fixed, for example by using an adhesive, eutectic bonding, ultrasonic welding, or other substance or method, to the package. The package may include a central cavity and two passages to connect the cavity to the shunt flow paths of the cap. A pressure sensor chip may be placed over an opening of one of the passages in the pressure sensor package. In this way, a membrane of the pressure sensor chip may have a first side exposed to fluid from a first side of the dimensional variation of the cap and a second side exposed to fluid from a second side of the dimensional variation of the cap. The package may include signal conditioning circuitry, which may be at least partially located on a signal conditioning chip. The signal conditioning circuitry may be at least partially located on one or more pressure sensor chips in the pressure sensor, or on other circuits or chips in or otherwise associated with the pressure sensor. The signal conditioning circuitry may be used to condition input signals from a resistor network on the membrane of the pressure sensor chip. The signal conditioning chip may also store calibration data and perform some or all of the calculations necessary to determine the flowrate from the differential pressure.

Various embodiments of the present invention may incorporate one or more of these and the other features described herein. A better understanding of the nature and advantages of the present invention may be gained by reference to the following detailed description and the accompanying drawings.

DESCRIPTION OF ILLUSTRATIVE EMBODIMENTS

Figure 1:
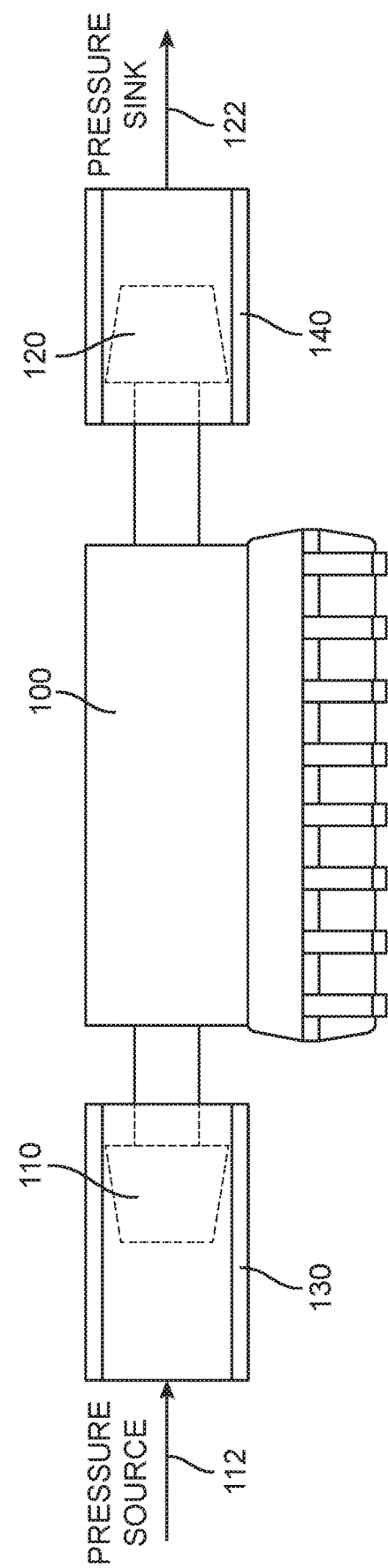
FIG. 1 illustrates a pressure sensor for flowrate monitoring according to an embodiment of the present invention.

FIG. 1 illustrates a pressure sensor according to an embodiment of the present invention. This figure, as with the other included figures, is shown for illustrative purposes and does not limit the possible embodiments of the present invention or the claims.

In this embodiment of the present invention, pressure sensor 100 may be in a flow path in a flow structure. Pressure sensor 100 may include an inlet 110 and an outlet 120. Inlet 110 may be connected to a flow structure via tubing 130, which may receive input flow from pressure source 112. Outlet 120 may be connected to the flow structure via tubing 140, which may provide flow output to pressure sink 122. Pressure sensor 100 may include a flow path from inlet 110 to outlet 120.

Fluid may flow from pressure source 112 through tubing 130 to inlet 110. The fluid may exit from outlet 120, through tubing 140 to flow output or pressure sink 122. A flow path (not shown) in pressure sensor 100 may connect inlet 110 to outlet 120. The flow path in pressure sensor 100 may include a dimensional variation (not shown.) The dimensional variation may be a narrowing of the flow path, a venturi, or other partial obstruction. The dimensional variation may be a narrowed portion of material that forms the flow path, it may be formed using an obstruction, such as a ring around an inside wall of the flow path or other type of obstruction, or it may be formed in other ways. The obstruction may form a differential pressure that may be measured by pressure sensor 100. From the differential pressure, the flowrate of the fluid may be determined.

The flowrates of various fluids may be determined using pressure sensor 100. These fluids may be either gases or liquids. For example, a flow of natural gas, air, or other gases, liquids, or other type of substances may be measured using these and other embodiments of the present invention.

The flowrates of these fluids may be measured in various types of systems using pressure sensor 100. For example, flowrates for fluids in heating, ventilation, and air conditioning (HVAC) systems, oxygen concentrators, ventilators, air filters, spirometers, automotive, aerosol drug delivery systems, anesthesia, continuous positive airway pressure (CPAP) machines, industrial or chemical manufacturing environments (for example where gasses are mixed), or other types of applications may be measured.

Figure 2:
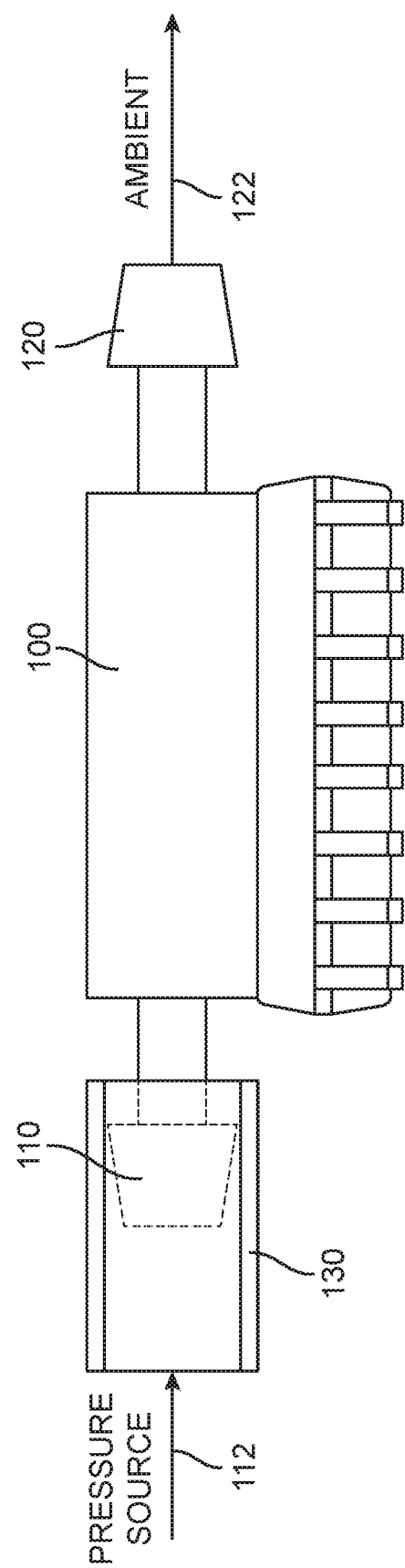
FIG. 2 illustrates a pressure sensor for flowrate monitoring according to an embodiment of the present invention.

FIG. 2 illustrates a pressure sensor according to an embodiment of the present invention. In this example, pressure sensor inlet 110 may be connected via tubing 130 to a flow path of a flow structure. The outlet 120 of pressure sensor 100 may be exposed to ambient air pressure or other environment. In this way, a pressure difference between a pressure in a flow path and the ambient or other pressure may be determined.

Figure 3:
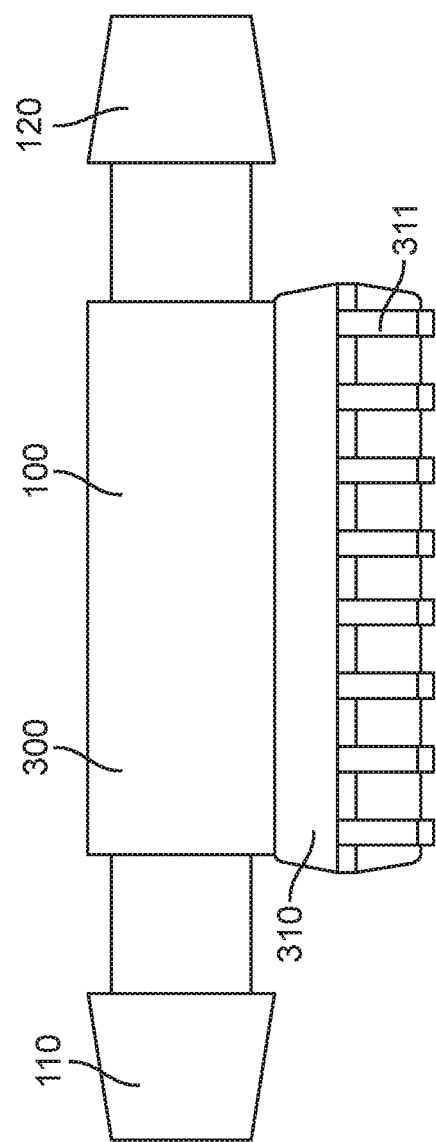
FIG. 3 illustrates a pressure sensor according to an embodiment of the present invention.

FIG. 3 illustrates a pressure sensor according to an embodiment of the present invention. Pressure sensor 100 may include pressure sensor cap 300. Pressure sensor cap 300 may include a flow path (not shown) connecting inlet 110 and outlet 120. Pressure sensor 100 may further include a package 310 supporting a number of contacts 311. Pins or contacts 311 may be surface-mount or through-hole contacts. A lid (not shown) may at least partially cover a bottom side of package 310.

Pressure sensor 100 may be formed in various ways. In various embodiments of the present invention, cap 300 and package 310 may be formed separately, while in other embodiments of the present invention, cap 300 and package 310 may be formed together as a single piece. Where cap 300 and package 310 are formed separately, they may be fixed or attached to each other, for example by using an adhesive, eutectic bonding, ultrasonic welding, or other substance or method. In other embodiments of the present invention, cap 300 and pressure sensor package 310 may be formed as a single piece. For example, cap 300 and pressure sensor package 310 maybe formed of plastic using insert, transfer molding, or other technique. In still other embodiments of the present invention, cap 300 may be formed of multiple portions that may be joined together, again by using adhesive, eutectic bonding, ultrasonic welding, or other material or method. In still other embodiments of the present invention, there may be one or more other structures (not shown) between cap 300 and package 310. These intervening structures may be solid, such that cap 300 and package 310 are fixed in space relative to each other, or the intervening structures may be pliable, such as sections of plastic tubing. The intervening structures may include a thermal sink to dissipate heat, or they may be other types of intervening structures.

The flow path in cap 300 may include a dimensional variation (not shown.) The dimensional variation may be a narrowing of the flow path, a venturi, or other partial obstruction. The dimensional variation may be a narrowed portion of material that forms the flow path, or it may be formed using an obstruction, such as a ring around an inside wall of the flow path, or other type of obstruction. The pressure of the fluid flowing through the pressure sensor flow path may be different on each side of the dimensional variation. This differential pressure may increase with increasing flowrate. This differential pressure may be measured using one or more pressure sensor chips (not shown) located in package 310 of pressure sensor 100. The differential pressure measured by the one or more pressure sensor chips may then be used to determine the rate of flow through the pressure sensor flow path. Examples of flow paths provided by embodiments of the present invention are shown in the following figures.

Figure 4:
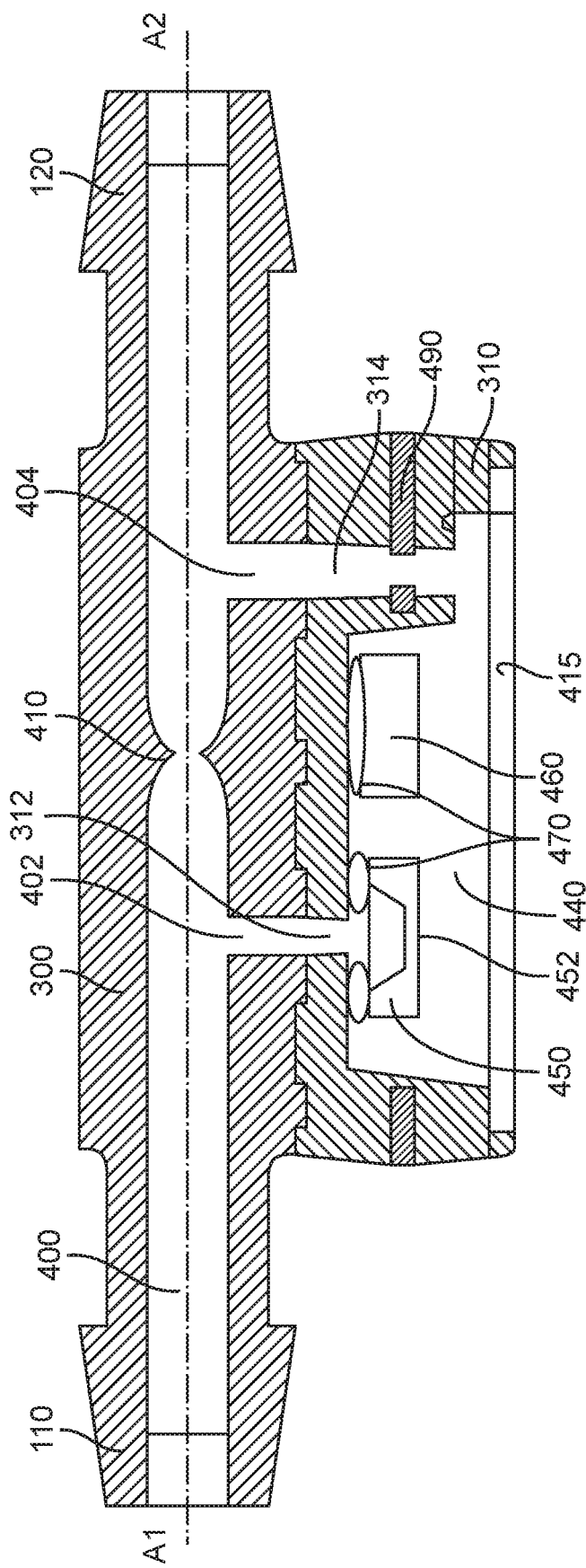
FIG. 4 illustrates a cross-section of a pressure sensor according to an embodiment of the present invention.

FIG. 4 illustrates a cross-section of a pressure sensor according to an embodiment of the present invention. Cap 300 may include inlet 110 and outlet 120. A flow path 400 may extend from inlet 110 to outlet 120. Flow path 400 may include a dimensional variation 410. In this example, dimensional variation 410 is shown as a narrowing of the flow path 400. In this example, dimensional variation 410 may be molded or otherwise formed with the other portions of cap 300. In other embodiments of the present invention, dimensional variation 410 may be an obstruction of the flow path 400. For example, the dimensional variation 410 may be a narrowing formed using an obstruction, such as a ring on the inside surface of flow path 400.

Shunt flow passages 402 and 404 may provide passages from flow path 400 to openings on a bottom side of cap 300.

The openings on bottom side of cap 300 may be at least approximately aligned with passages 312 and 314 in package 310. Pressure sensor chip 450 may block the flow of fluid in shunt passage 402 and passage 312 in package 310. In this way, the pressure in shunt passage 402 and passage 312 may be applied to a first side of the membrane of pressure sensor chip 450. Fluid in passage 404 and passage 314 may be applied via cavity 440 to a second side of the membrane of pressure sensor chip 450. The resulting difference in pressure may apply a stress to membrane 452 of pressure sensor chip 450 and a resulting signal may be measured. For example, a Wheatstone bridge or other circuit (not shown) may be formed on or near membrane 452 of pressure sensor chip 450. The differential pressure across membrane 452 may cause the Wheatstone bridge or other circuit to generate a resulting output signal.

In these and other embodiments of the present invention, the resulting output signals may be conditioned by signal conditioning circuitry, which may be at least partially located on signal conditioning chip 460, pressure sensor chip 450, or on other circuits or chips in or associated with the pressure sensor. This signal conditioning circuitry may also perform some or all of the computations needed to convert the pressure applied to the membrane of pressure sensor chip 450 to a flowrate in flow path 400 of cap 300. Signal conditioning chip 460 or other signal conditioning circuitry may provide temperature compensation for readings taken by pressure sensor chip 450. Lid 415 may be used to seal a bottom side of package 310 after pressure sensor chip 450 and signal conditioning chip 460 have been put in place. Lid 415 may be conductive or nonconductive. For example, lid 415 may be electrically connected to ground and used for shielding.

Pressure sensor chip 450 may be used to seal flow path or passage 312 by using an adhesive or other substance 470. This seal may effectively block fluid flow between shunt passage 402 and passage 312 and cavity 440.

Cap 300 (along with its dimensional variation 410) and package 310 may be formed in various ways, such as by molding, 3-D printing, or other process. For example, cap 300 may be formed by transfer molding. Cap 300 may be formed by molding an upper portion of cap 300 above reference line A1-A2 and a lower portion of cap 300 below reference line A1-A2. The upper portion and the lower portion may then be fixed to each other, for example by using an adhesive, eutectic bonding, ultrasonic welding, or other substance or method. Cap 300 may then be similarly fixed to package 310, though these portions may be fixed to each other in different ways and in different orders.

Pressure sensor chip 450 and signal conditioning chip 460 may be fixed to a top side of cavity 440 by adhesives 470 or other materials. Pressure sensor chip 450 and signal conditioning chip 460 may be electrically connected to pads 490 of contacts 311 (shown in FIG. 3) of package 310 using bond wires or other techniques (not shown.) Pressure sensor chip 450 and signal conditioning chip 460 may be electrically connected to each other also using bond wires or other techniques. Cavity 440 may then be sealed by lid 415.

Figure 5:
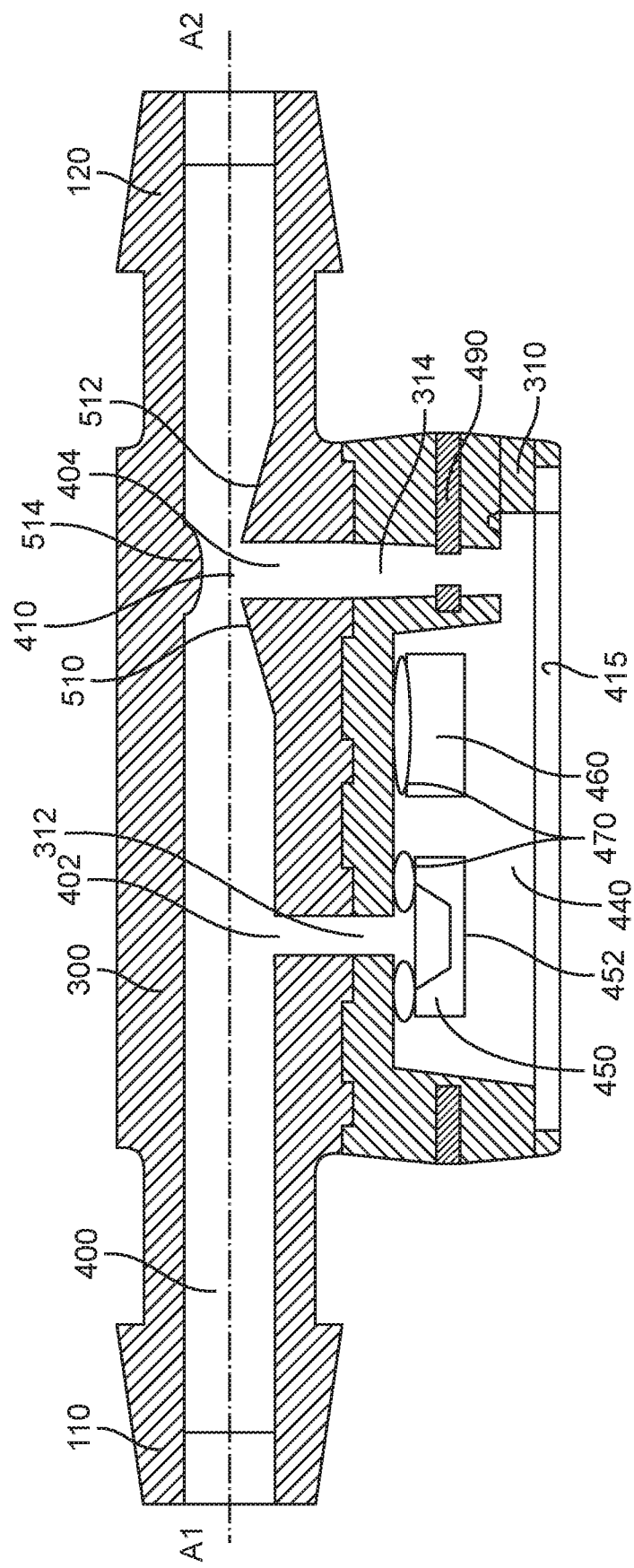
FIG. 5 illustrates a cross-section of another pressure sensor according to an embodiment of the present invention.

FIG. 5 illustrates a cross-section of another pressure sensor according to an embodiment of the present invention. As before, cap 300 may include inlet 110 and outlet 120. A flow path 400 may extend from inlet 110 to outlet 120. Flow path 400 may include a dimensional variation 410, which in this case may be a venturi. In this example, the venturi may form a narrowing of flow path 400 that includes leading edge ramp 510, trailing edge ramp 512, and partial obstruction 514. In other embodiments of the present invention, either or both trailing edge ramp 512 and partial obstruction 514 may be omitted to simplify manufacturing or for other reason. Fluid flowing in flow path 400 may be compressed and therefore have a higher pressure upon reaching the leading edge ramp 510. This increase in pressure may cause a vacuum pressure to be created in shunt flow passage 404. This vacuum pressure may also appear in cavity 440, thereby creating a differential pressure with the fluid in shunt flow passage 402. This differential pressure may increase with increasing flowrate of the fluid in flow path 400. This may provide a pressure sensor having an output that is related to flowrate. Accordingly, this output may be used to determine flowrate in flow path 400.

As before, shunt flow passages 402 and 404 may provide passages from flow path 400 to openings on a bottom side of cap 300. The openings on bottom side of cap 300 may be at least approximately aligned with passages 312 and 314 in package 310. Pressure sensor chip 450 may block the flow of fluid in shunt passage 402 and passage 312 in package 310. Fluid in flow path 400 may reach a first side of membrane 452, while the vacuum pressure created by the venturi may be applied to the second side of membrane 452. The resulting difference in pressure may apply a stress to membrane 452 of pressure sensor chip 450 and a resulting signal may be measured. For example, a Wheatstone bridge or other circuit (not shown) may be formed on or near membrane 452 of pressure sensor chip 450. The differential pressure across membrane 452 may cause the Wheatstone bridge or other circuit to generate a resulting output signal.

As before, the resulting output signals may be conditioned by signal conditioning circuitry, which may be at least partially located on signal conditioning chip 460. The signal conditioning circuitry may be at least partially located on one or more pressure sensor chips in the pressure sensor, such as pressure sensor chip 450, or on other circuits or chips in or otherwise associated with the pressure sensor. Signal conditioning chip 460 or other signal conditioning circuitry may also perform some or all of the computations needed to convert the pressure applied to the membrane of pressure sensor chip 450 to a flowrate in flow path 400 of cap 300. Signal conditioning chip 460 may provide temperature compensation for readings taken by pressure sensor chip 450. Lid 415 may be used to seal a bottom side of package 310 after pressure sensor chip 450 and signal conditioning chip 460 have been put in place. Lid 415 may be conductive or nonconductive. For example, lid 415 may be electrically connected to ground and used for shielding. Pressure sensor chip 450 may be used to seal flow path or passage 312 by using an adhesive or other substance 470. This seal may effectively block fluid flow between shunt passage 402 and passage 312 and cavity 440.

Again, cap 300 and package 310 may be formed in various ways, such as by molding, 3-D printing, or other process. For example, cap 300 may be formed by transfer molding. Cap 300 may be formed by molding an upper portion of cap 300 above reference line A1-A2 and a lower portion of cap 300 below reference line A1-A2. The upper portion and the lower portion may then be fixed to each other, for example by using an adhesive, eutectic bonding, ultrasonic welding, or other substance or method. Cap 300 may then be similarly fixed to package 310, though these portions may be fixed to each other in different ways and in different orders.

Pressure sensor chip 450 and signal conditioning chip 460 may be fixed to a top side of cavity 440 by adhesives 470 or other materials. Pressure sensor chip 450 and signal conditioning chip 460 may be electrically connected to pads 490 of contacts 311 of package 310 using bond wires or other techniques (not shown.) Pressure sensor chip 450 and signal conditioning chip 460 may be electrically connected to each other also using bond wires (not shown) or other techniques. Cavity 440 may then be sealed by lid 415.

Figure 6:
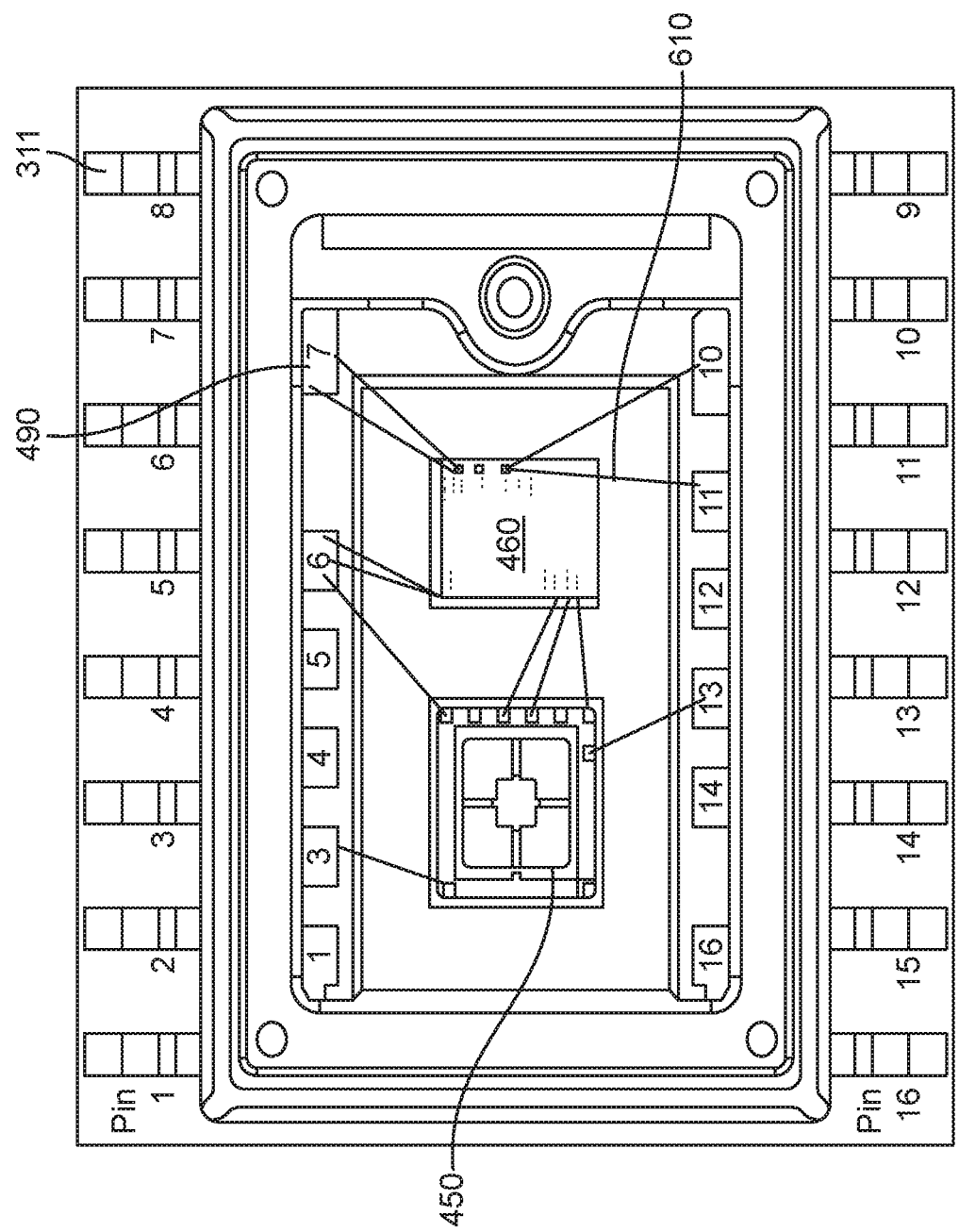
FIG. 6 illustrates a bottom cross-section view of a pressure sensor package according to an embodiment of the present invention.

FIG. 6 illustrates a bottom cross-section view of a pressure sensor package 310 according to an embodiment of the present invention. In this example, pressure sensor chip 450 and signal conditioning chip 460 may be bonded to a top side of cavity 440 of pressure sensor package 310, as shown in FIG. 4. Bond wires 610 may connect pads of pressure sensor chip 450 and signal conditioning chip 460 to pads of 490 of pins or contacts 311. Bond wires 610 may also connect pads of pressure sensor chip 450 to signal conditioning chip 460. Lid 415 may then be used to seal cavity 440, as shown in FIG. 4.

In the example of FIG. 4, a pressure sensor chip 450 in a differential configuration was shown. In these and other embodiments of the present invention, other configurations employing absolute and gauge pressure sensor chips may be used. Examples are shown in the following figures.

Figure 7:
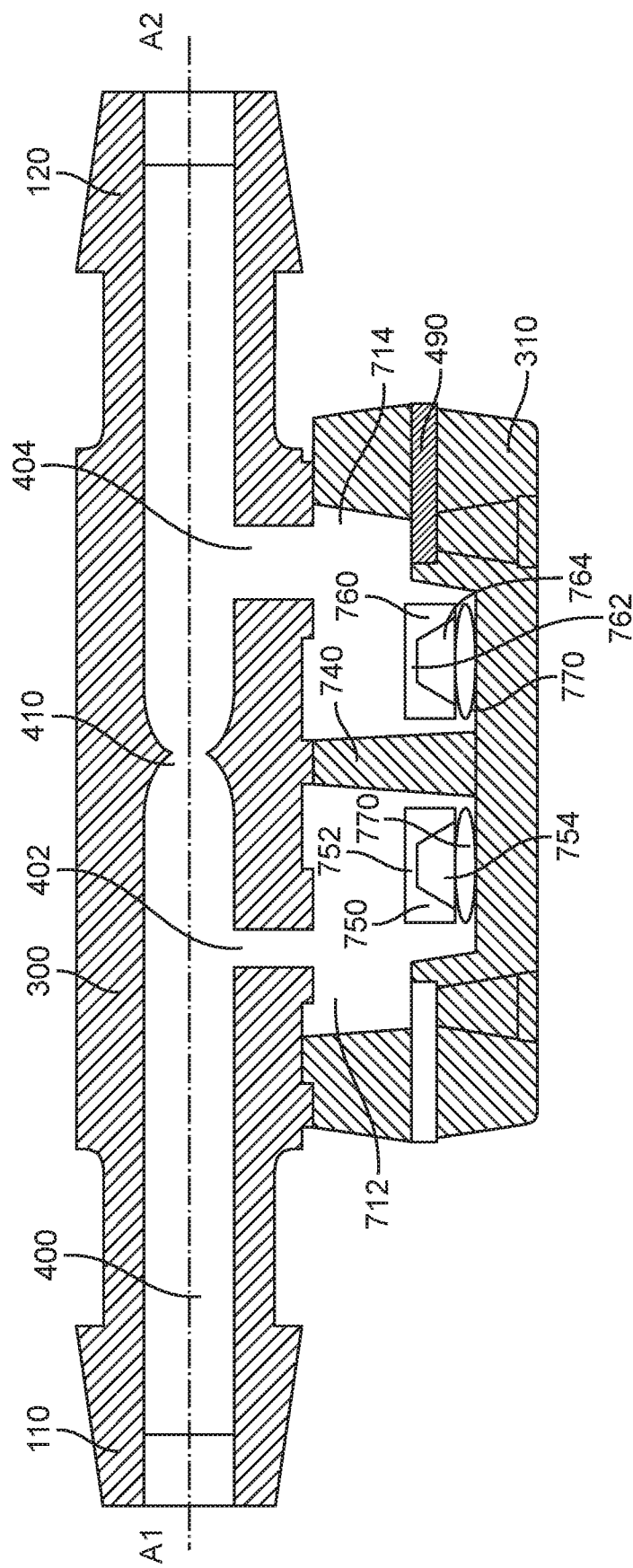
FIG. 7 illustrates a cross-section of another pressure sensor according to an embodiment of the present invention.

FIG. 7 illustrates a cross-section of another pressure sensor according to an embodiment of the present invention. As before, cap 300 may include inlet 110 and outlet 120. A flow path 400 may extend from inlet 110 to outlet 120. Flow path 400 may include a dimensional variation 410. As before, dimensional variation 410 is shown as a narrowing of the flow path 400. In this example, dimensional variation 410 may be molded or otherwise formed with the other portions of cap 300, such as the dimensional variations shown in FIG. 5 above. In other embodiments of the present invention, dimensional variation 410 may be an obstruction of the flow path 400. For example, the dimensional variation 410 may be a narrowing formed using an obstruction, such as a ring on the inside surface of flow path 400.

Shunt flow passages 402 and 404 may provide passages from flow path 400 to openings on a bottom side of cap 300. The openings on bottom side of cap 300 may be at least approximately aligned with cavities 712 and 714 in package 310, where cavities 712 and 714 are separated by wall 740. Pressure sensor chips 750 and 760 may be located in cavities 712 and 714, respectively. In this way, a fluid in shunt passage 402 and cavity 712 may be applied to a first side of membrane 752 of pressure sensor chip 750. Pressure sensor chip 750 may be configured as an absolute pressure sensor having a vacuum or other reference in cavity 754. For pressure sensor chip 750, a resulting difference in pressure between the pressure in cavity 712 and the reference in cavity 754 may be measured. For example, a Wheatstone bridge or other circuit (not shown) may be formed on or near membrane 752 of pressure sensor chip 750. The differential pressure across membrane 752 may cause the Wheatstone bridge or other circuit to generate a resulting output signal.

Similarly, fluid in passage 404 and cavity 714 may be applied to a first side of membrane 762 of pressure sensor chip 760. In this way, pressure sensor chip 750 may be exposed to a pressure of a fluid on a first side of dimensional variation 410 while pressure sensor chip 760 may be exposed to a pressure of a fluid on a second side of dimensional variation 410. Pressure sensor chip 760 may also be configured as absolute pressure sensor having a vacuum or other reference in cavity 764. For pressure sensor chip 760, a resulting difference in pressure between the pressure in cavity 714 and the vacuum or other reference in cavity 764 may be measured. For example, a Wheatstone bridge or other circuit (not shown) may be formed on or near membrane 762 of pressure sensor chip 760. The differential pressure across membrane 762 may cause the Wheatstone bridge or other circuit to generate a resulting output signal. The difference between the pressures read by pressure sensor chip 750 and pressure sensor chip 760 may then be determined and used to calculate or otherwise determine a flow rate in flow path 400.

The resulting output signals may be conditioned by signal conditioning circuitry, which may be at least partially formed on pressure sensor chip 750, pressure sensor chip 760, or both. In these and other embodiments of the present invention, the signal conditioning circuitry may be on a chip or chips aside from pressure sensor chip 750 and pressure sensor chip 760, though these functions may be distributed among any or all of these chips. This signal conditioning circuitry may also perform some or all of the computations needed to convert the pressure applied to the membrane of pressure sensor chips 750 and 760 to a flowrate in flow path 400 of cap 300. The signal conditioning circuitry may provide temperature compensation for readings taken by pressure sensor chips 750 and 760.

Package 310 may include wall 740. Wall 740 may effectively block fluid flow between cavity 712 and cavity 714. Cap 300 (along with its dimensional variation 410) and package 310 may be formed in various ways, such as by molding, 3-D printing, or other process. For example, cap 300 may be formed by transfer molding. Cap 300 may be formed by molding an upper portion of cap 300 above reference line A1-A2 and a lower portion of cap 300 below reference line A1-A2. The upper portion and the lower portion may then be fixed to each other, for example by using an adhesive, eutectic bonding, ultrasonic welding, or other substance or method. Cap 300 may then be similarly fixed to package 310, though these portions may be fixed to each other in different ways and in different orders.

Pressure sensor chips 750 and 760 may be fixed to package 310 by adhesives 770 or other materials. Pressure sensor chips 750 and 760 may be electrically connected to pads 490 of pins or contacts 311 of package 310 using bond wires or other techniques (not shown.) Pressure sensor chip 450 and signal conditioning chip 460 may be electrically connected to each other also using bond wires or other techniques. Cap 300 may then be fixed to package 310.

Figure 8:
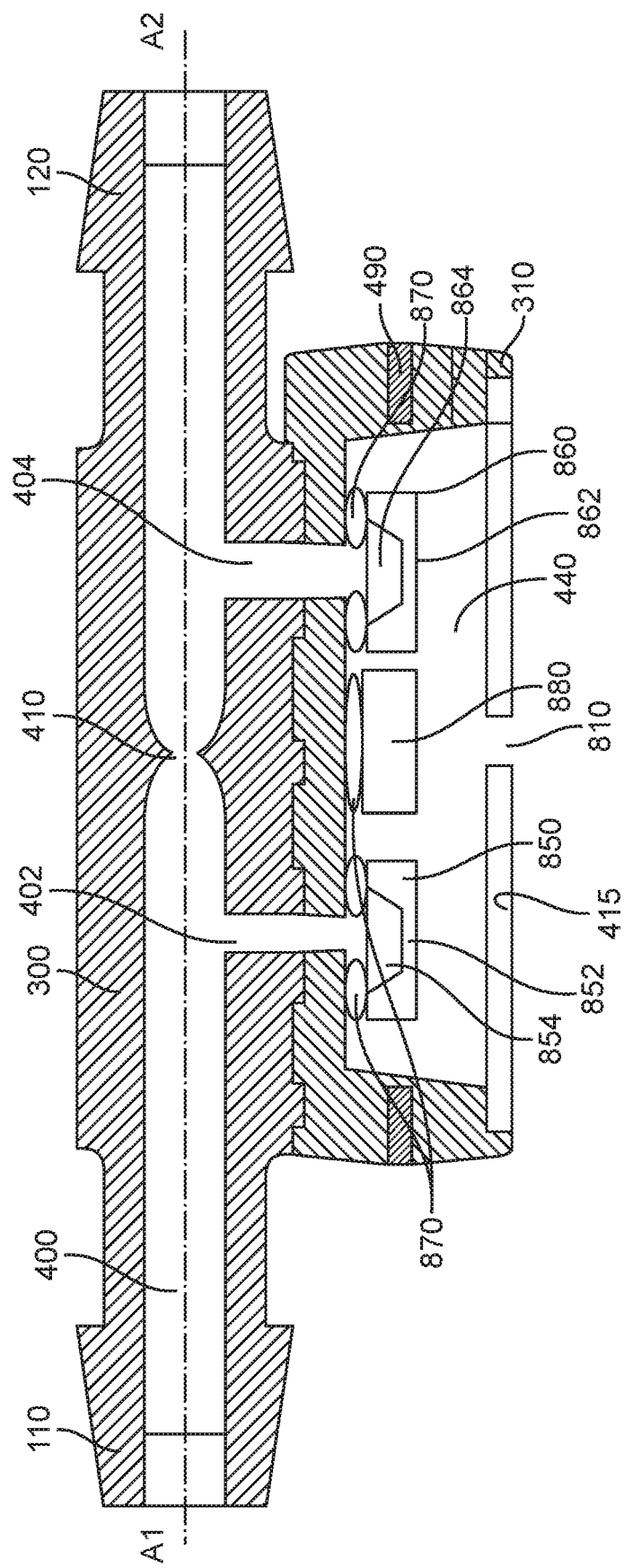
FIG. 8 illustrates a cross-section of another pressure sensor according to an embodiment of the present invention.

FIG. 8 illustrates a cross-section of another pressure sensor according to an embodiment of the present invention. As before, cap 300 may include inlet 110 and outlet 120. A flow path 400 may extend from inlet 110 to outlet 120. Flow path 400 may include a dimensional variation 410. As before, dimensional variation 410 is shown as a narrowing of the flow path 400. In this example, dimensional variation 410 may be molded or otherwise formed with the other portions of cap 300, such as the dimensional variations shown in FIG. 5 above. In other embodiments of the present invention, dimensional variation 410 may be an obstruction of the flow path 400. For example, the dimensional variation 410 may be a narrowing formed using an obstruction, such as a ring on the inside surface of flow path 400.

Shunt flow passages 402 and 404 may provide passages from flow path 400 to openings on a bottom side of cap 300. The openings on bottom side of cap 300 may be at least approximately aligned with cavities 854 and 864 in pressure sensor chips 850 and 860. Pressure sensor chips 850 and 860 may be configured as gauge pressure sensors. In this way, a fluid in shunt passage 402 and cavity 854 of pressure sensor chip 850 may be applied to a first side of the membrane 852 of pressure sensor chip 850. Pressure sensor chip 850 may be configured as a gauge pressure sensor having second side open to ambient or other conditions though opening 810 in lid 415 via cavity 440. In these and other embodiments of the present invention, opening 810 may be a circular opening. For pressure sensor chip 850, a resulting difference in pressure between the pressure in cavity 854 and the pressure in cavity 440 may be measured. For example, a Wheatstone bridge or other circuit (not shown) may be formed on or near membrane 852 of pressure sensor chip 850. The differential pressure across membrane 852 may cause the Wheatstone bridge or other circuit to generate a resulting output signal.

Similarly, fluid in passage 404 and cavity 864 of pressure sensor chip 860 may be applied to a first side of the membrane 862 of pressure sensor chip 860. Pressure sensor chip 860 may also be configured as a gauge pressure sensor having a second side exposed to ambient or other conditions via opening 810 in lid 415 via cavity 440. For pressure sensor chip 860, a resulting difference in pressure between the pressure in cavity 864 and the pressure in cavity 440 may be measured. For example, a Wheatstone bridge or other circuit (not shown) may be formed on or near membrane 862 of pressure sensor chip 860. The differential pressure across membrane 862 may cause the Wheatstone bridge or other circuit to generate a resulting output signal. In this way, pressure sensor chip 850 may be exposed to a pressure of a fluid on a first side of dimensional variation 410 while pressure sensor chip 860 may be exposed to a pressure of a fluid on a second side of dimensional variation 410. The difference between the pressures read by pressure sensor chip 850 and pressure sensor chip 860 may then be determined and used to calculate or otherwise determine a flow rate in flow path 400.

The resulting output signals may be conditioned by signal conditioning circuitry, shown here as signal conditioning circuitry 880. In these and other embodiments of the present invention, this signal conditioning circuitry may be at least partially formed on pressure sensor chip 850, pressure sensor chip 860, or both. In these and other embodiments of the present invention, the signal conditioning circuitry 880 may be on a chip or chips other pressure sensor chip 850 and pressure sensor chip 860, or it may be distributed among any or all of these chips. Signal conditioning circuitry 880 may also perform some or all of the computations needed to convert the pressure applied to the membrane of pressure sensor chips 850 and 860 to a flowrate in flow path 400 of cap 300. The signal conditioning circuitry may provide temperature compensation for readings taken by pressure sensor chips 850 and 860.

Cap 300 (along with its dimensional variation 410) and package 310 may be formed in various ways, such as by molding, 3-D printing, or other process. For example, cap 300 may be formed by transfer molding. Cap 300 may be formed by molding an upper portion of cap 300 above reference line A1-A2 and a lower portion of cap 300 below reference line A1-A2. The upper portion and the lower portion may then be fixed to each other, for example by using an adhesive, eutectic bonding, ultrasonic welding, or other substance or method. Cap 300 may then be similarly fixed to package 310, though these portions may be fixed to each other in different ways and in different orders.

Pressure sensor chips 850 and 860 and signal conditioning circuitry 880 may be fixed to package 310 by adhesives 870 or other materials. Pressure sensor chips 850 and 860 and signal conditioning circuitry 880 may be electrically connected to pads 490 of pins or contacts 311 of package 310 using bond wires or other techniques (not shown.) Pressure sensor chips 850 and 860 and signal conditioning circuitry 880 may be electrically connected to each other also using bond wires or other techniques. Lid 415 having opening 810 may then be placed over the bottom opening in package 310.

Figure 9:
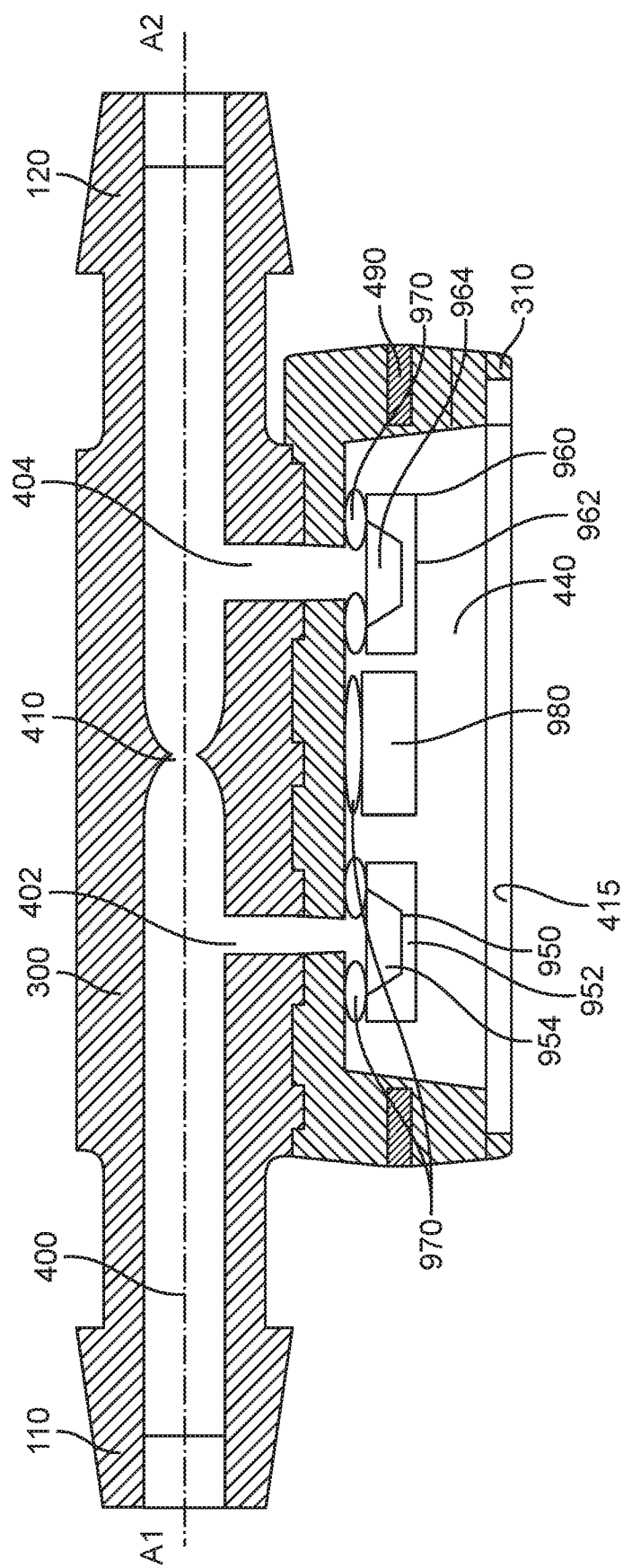
FIG. 9 illustrates a cross-section of another pressure sensor according to an embodiment of the present invention.

FIG. 9 illustrates a cross-section of another pressure sensor according to an embodiment of the present invention. As before, cap 300 may include inlet 110 and outlet 120. A flow path 400 may extend from inlet 110 to outlet 120. Flow path 400 may include a dimensional variation 410. As before, dimensional variation 410 is shown as a narrowing of the flow path 400. In this example, dimensional variation 410 may be molded or otherwise formed with the other portions of cap 300, such as the dimensional variations shown in FIG. 5 above. In other embodiments of the present invention, dimensional variation 410 may be an obstruction of the flow path 400. For example, the dimensional variation 410 may be a narrowing formed using an obstruction, such as a ring on the inside surface of flow path 400.

Shunt flow passages 402 and 404 may provide passages from flow path 400 to openings on a bottom side of cap 300. The openings on bottom side of cap 300 may be at least approximately aligned with cavities 954 and 964 in pressure sensor chips 950 and 960. Pressure sensor chips 950 and 960 may be configured as absolute pressure sensors. In this way, a fluid in shunt passage 402 and cavity 954 of pressure sensor chip 950 may be applied to a first side of the membrane of pressure sensor chip 950. Pressure sensor chip 950 may be configured as an absolute pressure sensor having second side exposed to the reference environment in reference cavity 440. Reference cavity 440 may be a vacuum, it may be at ambient, or it may be at another pressure, while the pressure sensor may be used in ambient or environments other than ambient. For pressure sensor chip 950, a resulting difference in pressure between the pressure in cavity 954 and the reference cavity 440 may be measured. For example, a Wheatstone bridge or other circuit (not shown) may be formed on or near membrane 952 of pressure sensor chip 950. The differential pressure across membrane 952 may cause the Wheatstone bridge or other circuit to generate a resulting output signal.

Similarly, fluid in passage 404 and cavity 964 of pressure sensor chip 960 may be applied to a first side of the membrane of pressure sensor chip 960. Pressure sensor chip 960 may also be configured as an absolute pressure sensor having a second side exposed to reference cavity 440. For pressure sensor chip 960, a resulting difference in pressure between the pressure in cavity 964 and the reference cavity 440 may be measured. For example, a Wheatstone bridge or other circuit (not shown) may be formed on or near membrane 962 of pressure sensor chip 960. The differential pressure across membrane 962 may cause the Wheatstone bridge or other circuit to generate a resulting output signal. In this way, pressure sensor chip 950 may be exposed to a pressure of a fluid on a first side of dimensional variation 410 while pressure sensor chip 960 may be exposed to a pressure of a fluid on a second side of dimensional variation 410. The difference between the pressures read by pressure sensor chip 950 and pressure sensor chip 960 may then be determined and used to calculate or otherwise determine a flow rate in flow path 400.

The resulting output signals may be conditioned by signal conditioning circuitry 980. In these and other embodiments of the present invention, this signal conditioning circuitry may be formed at least partially on pressure sensor chip 950, pressure sensor chip 960, or both. In these and other embodiments of the present invention, signal conditioning circuitry 980 may be on a chip or chips other than pressure sensor chip 950 and pressure sensor chip 960, or this function may be distributed among any or all of these chips. Signal conditioning circuitry 980 may also perform some or all of the computations needed to convert the pressure applied to the membrane of pressure sensor chips 950 and 960 to a flowrate in flow path 400 of cap 300. Signal conditioning circuitry 980 may provide temperature compensation for readings taken by pressure sensor chips 950 and 960.

Cap 300 (along with its dimensional variation 410) and package 310 may be formed in various ways, such as by molding, 3-D printing, or other process. For example, cap 300 may be formed by transfer molding. Cap 300 may be formed by molding an upper portion of cap 300 above reference line A1-A2 and a lower portion of cap 300 below reference line A1-A2. The upper portion and the lower portion may then be fixed to each other, for example by using an adhesive, eutectic bonding, ultrasonic welding, or other substance or method. Cap 300 may then be similarly fixed to package 310, though these portions may be fixed to each other in different ways and in different orders. Lid 415 may then be attached to a bottom of package 310.

Pressure sensor chips 950 and 960 and signal conditioning circuitry 980 may be fixed to package 310 by adhesives 970 or other materials. Pressure sensor chips 950 and 960 and signal conditioning circuitry 980 may be electrically connected to pads 490 of pins or contacts 311 of package 310 using bond wires or other techniques (not shown.) Pressure sensor chips 950 and 960 and signal conditioning circuitry 980 may be electrically connected to each other also using bond wires or other techniques. Lid 415 may then be attached to a bottom of package 310.

Figure 10:
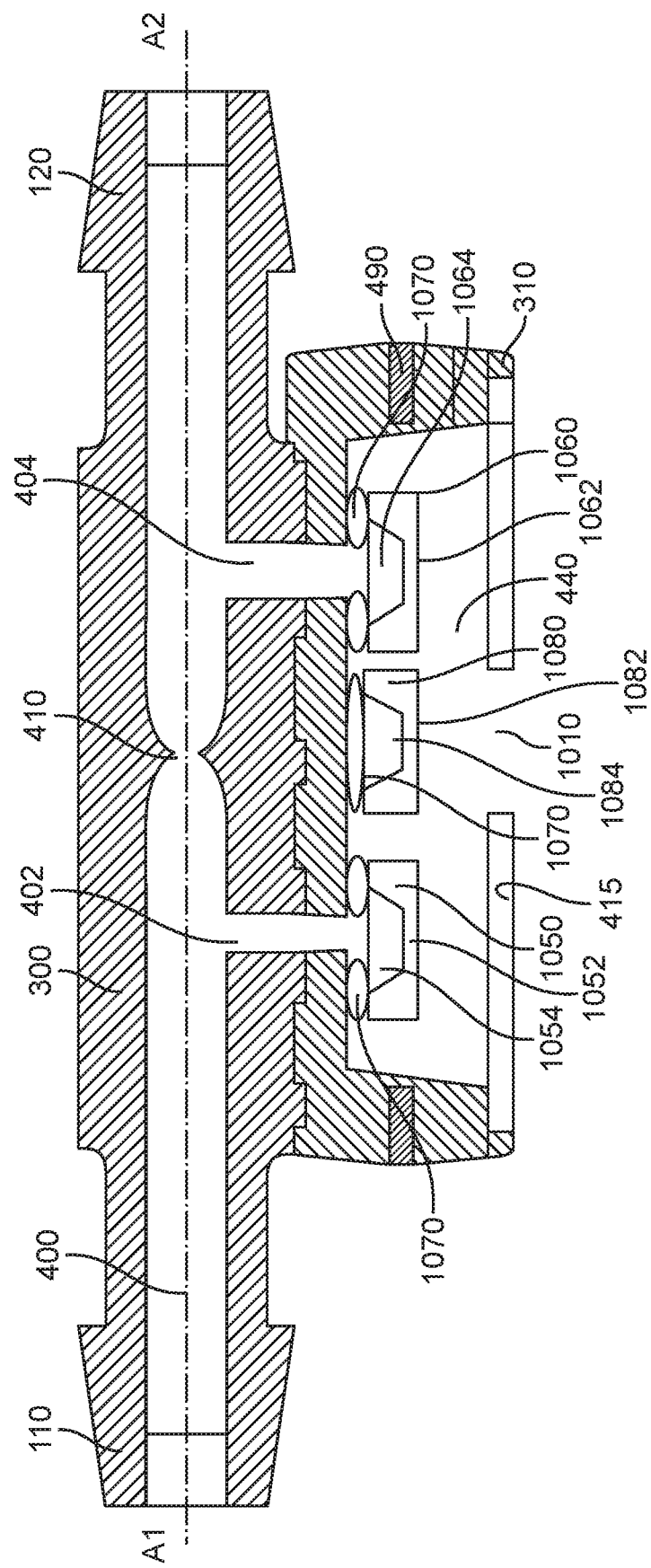
FIG. 10 illustrates a cross-section of another pressure sensor according to an embodiment of the present invention.

FIG. 10 illustrates a cross-section of another pressure sensor according to an embodiment of the present invention. As before, cap 300 may include inlet 110 and outlet 120. A flow path 400 may extend from inlet 110 to outlet 120. Flow path 400 may include a dimensional variation 410. As before, dimensional variation 410 is shown as a narrowing of the flow path 400. In this example, dimensional variation 410 may be molded or otherwise formed with the other portions of cap 300, such as the dimensional variations shown in FIG. 5 above. In other embodiments of the present invention, dimensional variation 410 may be an obstruction of the flow path 400. For example, the dimensional variation 410 may be a narrowing formed using an obstruction, such as a ring on the inside surface of flow path 400.

Shunt flow passages 402 and 404 may provide passages from flow path 400 to openings on a bottom side of cap 300. The openings on bottom side of cap 300 may be at least approximately aligned with cavities 1054 and 1064 in pressure sensor chips 1050 and 1060. Pressure sensor chips 1050 and 1060 may be configured as gauge pressure sensors. In this way, a fluid in shunt passage 402 and cavity 1054 of pressure sensor chip 1050 may be applied to a first side of the membrane 1052 of pressure sensor chip 1050. Pressure sensor chip 1050 may be configured as a gauge pressure sensor having second side open to ambient or other local conditions though opening 1010 in lid 415 via cavity 440. In these and other embodiments of the present invention, opening 1010 may be a circular opening. For pressure sensor chip 1050, a resulting difference in pressure between the pressure in cavity 1054 and the pressure in cavity 440 may be measured. For example, a Wheatstone bridge or other circuit (not shown) may be formed on or near membrane 1052 of pressure sensor chip 1050. The differential pressure across membrane 1052 may cause the Wheatstone bridge or other circuit to generate a resulting output signal.

Similarly, fluid in passage 404 and cavity 1064 of pressure sensor chip 1060 may be applied to a first side of the membrane 1062 of pressure sensor chip 1060. Pressure sensor chip 1060 may also be configured as a gauge pressure sensor having a second side exposed to ambient or other local conditions via opening 1010 in lid 415 via cavity 440. For pressure sensor chip 1060, a resulting difference in pressure between the pressure in cavity 1064 and the pressure in cavity 444 may be measured. For example, a Wheatstone bridge or other circuit (not shown) may be formed on or near membrane 1062 of pressure sensor chip 1060. The differential pressure across membrane 1062 may cause the Wheatstone bridge or other circuit to generate a resulting output signal. In this way, pressure sensor chip 1050 may be exposed to a pressure of a fluid on a first side of dimensional variation 410 while pressure sensor chip 1060 may be exposed to a pressure of a fluid on a second side of dimensional variation 410. The difference between the pressures read by pressure sensor chip 1050 and pressure sensor chip 1060 may then be determined and used to calculate or otherwise determine a flow rate in flow path 400.

Pressure sensor chip 1080 may be configured as an absolute pressure sensor, where a resulting difference in pressure between the pressure in cavity 440 and a reference pressure in reference cavity 1084 in a backside of pressure sensor chip 1080 may be measured. For example, a Wheatstone bridge or other circuit (not shown) may be formed on or near membrane 1082 of pressure sensor chip 1080. The pressure across membrane 1082 may cause the Wheatstone bridge or other circuit to generate a resulting output signal. Pressure sensor chip 1080 may be used to determine a pressure of an ambient or other local conditions via opening 1010 in lid 415 and cavity 440.

The resulting output signals may be conditioned by signal conditioning circuitry. In these and other embodiments of the present invention, this signal conditioning circuitry may be at least partially formed on pressure sensor chip 1050, pressure sensor chip 1060, pressure sensor chip 1080, or a combination thereof. In these and other embodiments of the present invention, the signal conditioning circuitry may be at least partially located on a separate chip or chips other than pressure sensor chip 1050, pressure sensor chip 1060, and pressure sensor chip 1080, though these functions may be distributed among any or all of these and other chips. The signal conditioning circuitry may also perform some or all of the computations needed to convert the pressure applied to the membrane of pressure sensor chips 1050 and 1060 to a flowrate in flow path 400 of cap 300. The signal conditioning circuitry may provide temperature compensation for readings taken by pressure sensor chips 1050 and 1060.

Cap 300 (along with its dimensional variation 410) and package 310 may be formed in various ways, such as by molding, 3-D printing, or other process. For example, cap 300 may be formed by transfer molding. Cap 300 may be formed by molding an upper portion of cap 300 above reference line A1-A2 and a lower portion of cap 300 below reference line A1-A2. The upper portion and the lower portion may then be fixed to each other, for example by using an adhesive, eutectic bonding, ultrasonic welding, or other substance or method. Cap 300 may then be similarly fixed to package 310, though these portions may be fixed to each other in different ways and in different orders.

Pressure sensor chips 1050, 1060, and 1080, as well as a signal conditioning circuitry chip when included, may be fixed to package 310 by adhesives 1070 or other materials. Pressure sensor chips 1050, 1060, and 1080, as well as a signal conditioning circuitry chip when included, may be electrically connected to pads 490 of pins or contacts 311 of package 310 using bond wires or other techniques (not shown.) Pressure sensor chips 1050, 1060, and 1080, as well as signal conditioning circuitry when included, may be electrically connected to each other also using bond wires or other techniques. Lid 415 having opening 1010 may then be placed over the bottom opening in package 310.

Figure 11:
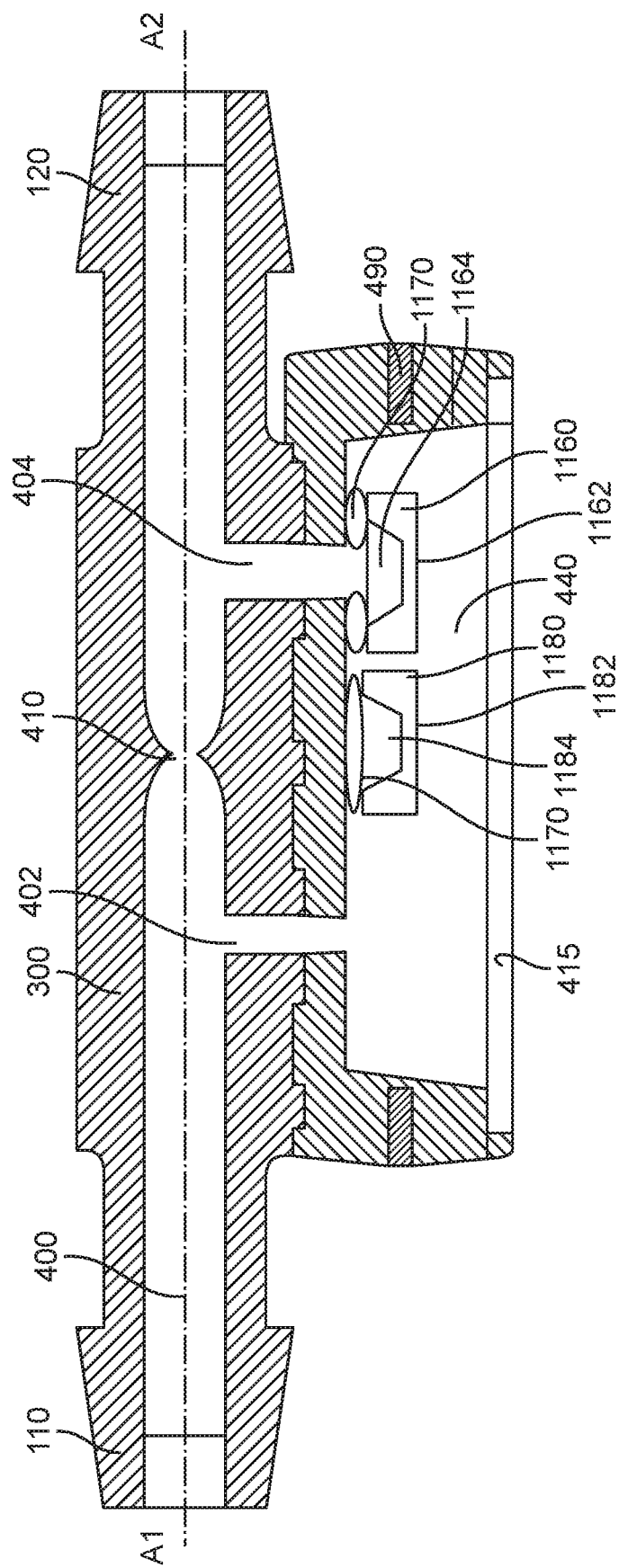
FIG. 11 illustrates a cross-section of another pressure sensor according to an embodiment of the present invention.

FIG. 11 illustrates a cross-section of another pressure sensor according to an embodiment of the present invention. As before, cap 300 may include inlet 110 and outlet 120. A flow path 400 may extend from inlet 110 to outlet 120. Flow path 400 may include a dimensional variation 410. As before, dimensional variation 410 is shown as a narrowing of the flow path 400. In these and other embodiments of the present invention, dimensional variation 410 may be molded or otherwise formed with the other portions of cap 300, such as the dimensional variations shown in FIG. 5 above. In other embodiments of the present invention, dimensional variation 410 may be an obstruction of the flow path 400. For example, the dimensional variation 410 may be a narrowing formed using an obstruction, such as a ring on the inside surface of flow path 400.

Shunt flow passages 402 and 404 may provide passages from flow path 400 to openings on a bottom side of cap 300. Passage 404 may provide an opening on bottom side of cap 300 that may be at least approximately aligned with cavity 1164 in pressure sensor chip 1160. In this way, a fluid in shunt passage 404 and cavity 1164 of pressure sensor chip 1160 may be applied to a first side of the membrane of pressure sensor chip 1160. Pressure sensor chip 1160 may be configured as a gauge or differential pressure sensor having second side exposed to cavity 440. Cavity 440 may be at the pressure in shunt passage 402.

Pressure sensor chip 1180 may be configured as an absolute pressure sensor, where a resulting difference in pressure between the pressure in cavity 440 and the reference cavity 1184 in a backside of pressure sensor chip 1180 may be measured. For example, a Wheatstone bridge or other circuit (not shown) may be formed on or near membrane 1182 of pressure sensor chip 1180. The pressure across membrane 1182 may cause the Wheatstone bridge or other circuit to generate a resulting output signal.

In this way, pressure sensor chip 1160 may be exposed to the difference in pressure of a fluid on a first side and a second side of dimensional variation 410. Pressure sensor chip 1160 may be configured as a gauge or differential pressure sensor having a one side exposed to cavity 440 and a second side exposed passage 404. For pressure sensor chip 1160, a resulting difference in pressure between the pressure in cavity 440 and passage 404 may be measured. For example, a Wheatstone bridge or other circuit (not shown) may be formed on or near membrane 1162 of pressure sensor chip 1160. The differential pressure across membrane 1162 may cause the Wheatstone bridge or other circuit to generate a resulting output signal. The difference in pressure at pressure sensor chip 1160 may then be determined and used to calculate or otherwise determine a flow rate in flow path 400. Using pressure sensor chips 1160 and 1180 may be useful for applications where an absolute reference is needed (pressure sensor chip 1180) as well as the differential pressure (pressure sensor chip 1160) in flow path 400.

The resulting output signals may be conditioned by signal conditioning circuitry, which may be formed at least partially on pressure sensor chip 1180, pressure sensor chip 1160, or both. In these and other embodiments of the present invention, the signal conditioning circuitry may be on a chip or chips other than pressure sensor chip 1180 and pressure sensor chip 1160, though this functionality may be distributed among any or all of these chips. This signal conditioning circuitry may also perform some or all of the computations needed to convert the pressure applied to the membrane of pressure sensor chips 1180 and 1160 to a flowrate in flow path 400 of cap 300. The signal conditioning circuitry may provide temperature compensation for readings taken by pressure sensor chips 1180 and 1160.

Cap 300 (along with its dimensional variation 410) and package 310 may be formed in various ways, such as by molding, 3-D printing, or other process. For example, cap 300 may be formed by transfer molding. Cap 300 may be formed by molding an upper portion of cap 300 above reference line A1-A2 and a lower portion of cap 300 below reference line A1-A2. The upper portion and the lower portion may then be fixed to each other, for example by using an adhesive, eutectic bonding, ultrasonic welding, or other substance or method. Cap 300 may then be similarly fixed to package 310, though these portions may be fixed to each other in different ways and in different orders. Lid 415 may then be attached to a bottom of package 310.

Pressure sensor chips 1180 and 1160 may be fixed to package 310 by adhesives 1170 or other materials. Pressure sensor chips 1180 and 1160 may be electrically connected to pads 490 of pins or contacts 311 of package 310 using bond wires or other techniques (not shown.) Pressure sensor chips 1180 and 1160 may be electrically connected to each other also using bond wires or other techniques.

In various embodiments of the present invention, the relationship between a differential pressure measured across pressure sensor chips and the actual flow rate may vary as a function of the type of fluid that is flowing. Accordingly, in various embodiments of the present invention, the calibration data may be taken using a specific type of fluid, with the expectation that the pressure sensor will be used in a system with the same types of fluids. The calibration may also be done at specific temperatures and pressures that may be expected in the system where the pressure sensor will be used. These and other embodiments of the present invention may store multiple tables for different fluids. The various tables may be selected for use depending on the fluid to be measured. These and other embodiments of the present invention may provide a correction factor, where an extrapolated pressure may be corrected based on a type of fluid whose flowrate is being measured. These and other embodiments of the present invention may provide similar compensation schemes for other parameters that may be varied, such as fluid density, viscosity, or other parameters.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated. Thus, it will be appreciated that the invention is intended to cover all modifications and equivalents within the scope of the following claims.

What is claimed is:

1. A pressure sensor comprising:
   a package comprising:
      a central cavity;
      a first passage from a top side of the package to the central cavity and forming a first opening in the central cavity; and
      a second passage from the top side of the package to the central cavity;

a pressure sensor chip fixed to a top surface of the central cavity and over the first opening in the central cavity; and a cap fixed to the top surface of the package, the cap comprising:
- a flow path forming a first opening in the cap and a second opening in the cap;
- a first shunt passage from the flow path to a bottom side of the cap, where the first shunt passage is aligned with the first passage in the package;
- a second shunt passage from the flow path to the bottom side the cap, where the second shunt passage is aligned with the second passage in the package; and
- a dimensional variation in the flow path between the first shunt passage and the second shunt passage.

2. The pressure sensor of claim 1 wherein the cap further comprises a first nozzle for the first opening in the cap and a second nozzle for the second opening in the cap.

3. The pressure sensor of claim 2 wherein the first nozzle and the second nozzle are formed to mate with pliable tubing.

4. The pressure sensor of claim 2 further comprising a signal conditioning circuit.

5. The pressure sensor of claim 4 wherein the signal conditioning circuit is coupled to receive signals from the pressure sensor chip.

6. The pressure sensor of claim 5 wherein the pressure sensor chip is an integrated circuit.

7. The pressure sensor of claim 1 wherein the bottom side of the cap is glued to the top side of the package.

8. The pressure sensor of claim 1 wherein the dimensional variation is a narrowing of the flow path.

9. The pressure sensor of claim 1 wherein the dimensional variation is a venturi in the flow path.

10. A cap for a pressure sensor, the cap comprising:
- a flow path forming a first opening in the cap and a second opening in the cap;
- a first shunt passage from the flow path to a bottom side of the cap, where the first shunt passage is aligned with a first passage in a package;
- a second shunt passage from the flow path to the bottom side the cap, where the second shunt passage is aligned with a second passage in the package; and
- a dimensional variation in the flow path between the first shunt passage and the second shunt passage.

11. The cap of claim 10 wherein the cap further comprises a first nozzle for the first opening in the cap and a second nozzle for the second opening in the cap.

12. The cap of claim 11 wherein the first nozzle and the second nozzle are formed to mate with pliable tubing.

13. The cap of claim 10 wherein the dimensional variation is a narrowing of the flow path.

14. The cap of claim 10 wherein the dimensional variation is a venturi in the flow path.

15. The cap of claim 10 wherein the dimensional variation is formed by an obstruction in the flow path.

16. A pressure sensor comprising:
- a package comprising:
  - a first cavity;
  - a second cavity;
  - a wall separating the first cavity from the second cavity;
  - a first passage from a top side of the package to the first cavity and forming a first opening in the first cavity; and
  - a second passage from the top side of the package to the second cavity and forming a first opening in the second cavity;
- a first pressure sensor chip in the first cavity;
- a second pressure sensor chip in the second cavity; and
- a cap fixed to a top surface of the package, the cap comprising:
  - a flow path forming a first opening in the cap and a second opening in the cap;
  - a first shunt passage from the flow path to a bottom side of the cap, where the first shunt passage is aligned with the first passage in the package;
  - a second shunt passage from the flow path to the bottom side the cap, where the second shunt passage is aligned with the second passage in the package; and
  - a dimensional variation in the flow path between the first shunt passage and the second shunt passage.

17. The pressure sensor of claim 16 further comprising a signal conditioning circuit.

18. The pressure sensor of claim 17 wherein the signal conditioning circuit is coupled to receive signals from the first pressure sensor chip.

19. The pressure sensor of claim 16 wherein the dimensional variation is a narrowing of the flow path.

20. The pressure sensor of claim 16 wherein the dimensional variation is a venturi in the flow path.

* * * * *